Aug. 15, 1939.  C. A. WEST  2,169,482
CUTTING TOOL ASSEMBLY
Filed March 9, 1936  2 Sheets-Sheet 1
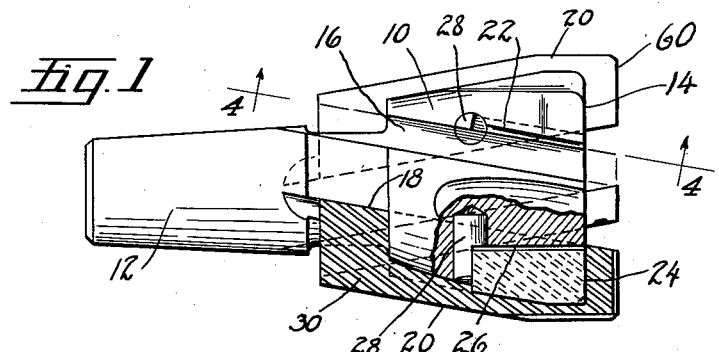
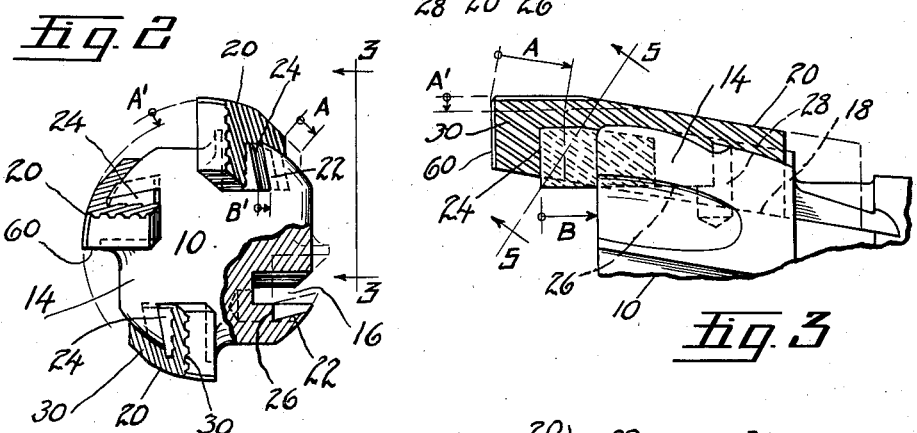
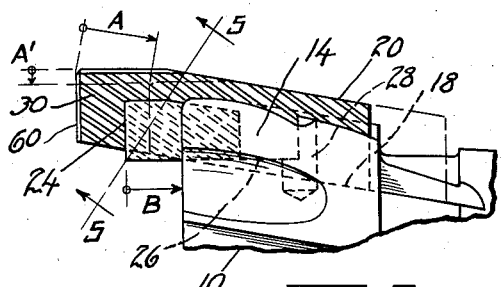
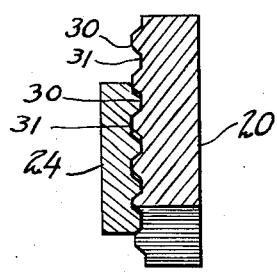
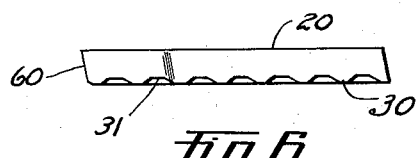
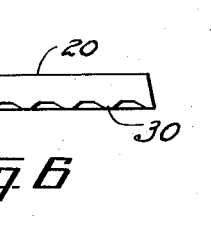
INVENTOR.
Claude A. West
BY
Parker & Burton
ATTORNEYS.

Aug. 15, 1939.   C. A. WEST   2,169,482
CUTTING TOOL ASSEMBLY
Filed March 9, 1936   2 Sheets-Sheet 2
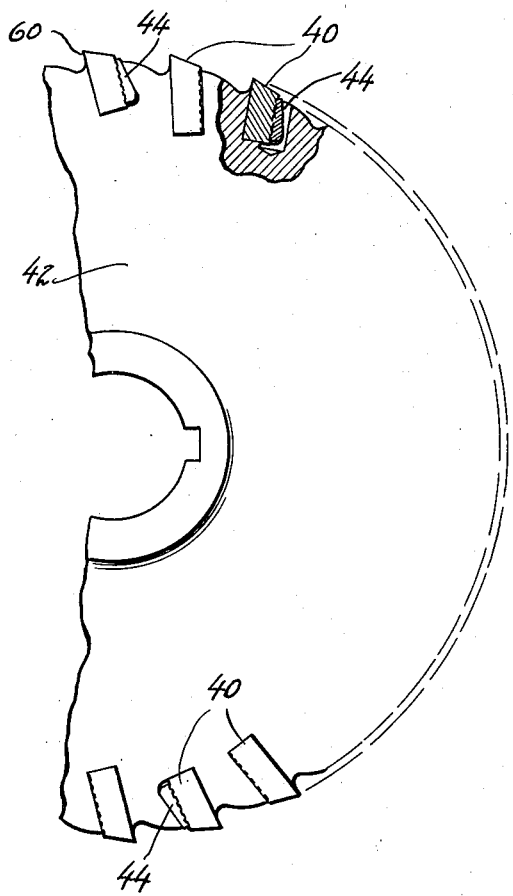
Fig. 8
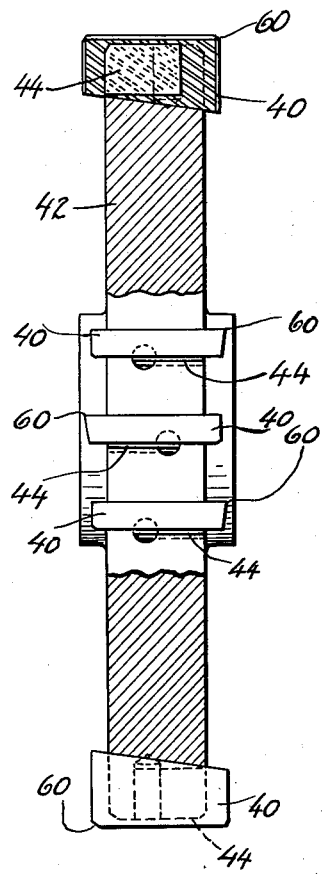
Fig. 9
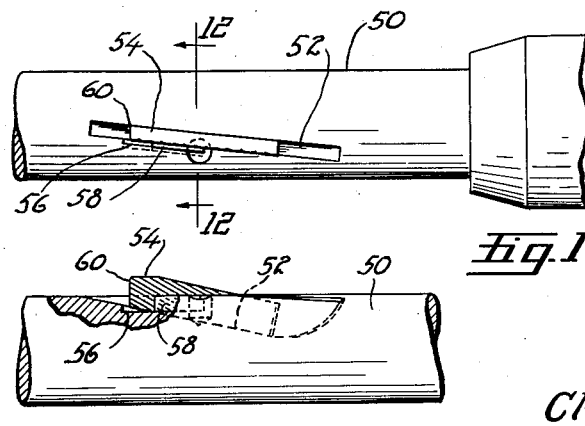
Fig. 10
Fig. 11
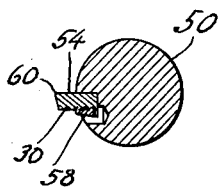
Fig. 12
INVENTOR.
Claude A. West
BY
ATTORNEYS.

Patented Aug. 15, 1939

2,169,482

UNITED STATES PATENT OFFICE 2,169,482

CUTTING TOOL ASSEMBLY

Claude A. West, Detroit, Mich., assignor to Gairing Tool Company, Detroit, Mich., a corporation of Michigan Application March 9, 1936, Serial No. 67,872

2 Claims. (Cl. 29—105)

This invention relates to tool holding devices and more particularly to an improved construction and arrangement for automatically securing one or more tools upon a tool holder for operation thereby.

It has been the practice in the past to secure tools and similar implements, such as cutting blades and reamers, to tool holding contrivances or bodies by rather awkward and cumbersome constructions which occupied a considerable amount of space and required manual adjustments on the part of the operator. Furthermore, the tool devices held thereby were likely to loosen in operation and become ineffective. In the case of cutters and reamers, and similar types of tools, a number of these are sometimes secured to one holding body, generally circumferentially around the body. Clamping devices requiring set screws and similar adjustable mechanism have been employed to grasp and secure the cutters to the holder. Besides being rather difficult and expensive to manufacture, these clamping devices occupied a considerable amount of space and limited the number of cutters which could be secured to the holder. They also were not certain in the operation. At times, the pressure of the work would cause the cutters to move or rock within the clamping devices thus impairing the efficiency of the cutter or perhaps spoiling the work altogether. In addition, valuable time was lost in adjusting these clamping devices for receiving and securing the tools.

An important object of this invention is to overcome these disadvantages by providing a tool holding construction which occupies little space and which is operable to receive and automatically lock the tools in position on the holder. Because of the small space required by this construction, a greater number of tools can be assembled on one holder. This permits a smoother operation which is of particular benefit in connection with cutting tools. Because of the automatic locking feature, very little time is consumed in attaching the tools to the holder or removing the tools therefrom. The construction for holding each tool is relatively simple, being readily made and requiring only one part in addition to the tool and the holder therefor. The tool and the additional part are simply inserted together into the space on the holder provided for receiving them, and the construction acts to lock the tool in place automatically. The pressure of the work to which the tool is directed tends to force the tool into greater locking position, and as a result the tool is positively locked against movement while performing its operation.

In two of the embodiments of the invention disclosed herein, the tool holder is provided with a series of circumferentially spaced recesses or grooves for receiving the shanks of the cutting blades or reamers intended to be held thereby. Coupled with the blades and accompanying them into their recesses are wedged-shaped members which are forced into wedging position in the recesses to lock the blades therein. The recesses and wedge members are so shaped as to force the wedge members in tight fitting engagement with the blades which they accompany and to wedge the blades securely in position. A meritorious feature of the invention resides in the method and manner of coupling the cutting tool and wedge-shaped members together. Means are provided on the adjacent surfaces of the wedge and the tool which interengage with one another in such a manner that when the tool is inserted longitudinally into a recess or groove in the tool holder, the wedge is carried therealong, but the interengagement is such that the wedge is allowed a lateral freedom of movement relative to the surface of the tool. The recess into which both are inserted is shaped to cause the wedge member to shift laterally over the surface of the tool or blade to lock the blade within the recess. This shiftable locking movement is in response to endwise movement of the cutter blade within the recess. This results in forcing the wedge into tight fitting engagement with the tool whereby the latter is strongly retained in the recess of the holder.

More specifically, the tool holder is recessed to provide a groove or compartment for receiving a tool and one wall of this groove is cut away to form a subsidiary recess for receiving the wedge member. The wedge receiving recess has a bottom and a side wall which are inclined respectively to the bottom and side walls of the main groove. In the embodiments of the invention illustrated herein, the bottom of the wedge receiving recess extends parallel to the axis of the tool holder while the bottom of the main recess or groove is inclined to the axis. The side wall of the wedge receiving recess is inclined to slightly overlie its bottom. The side walls of the main recess rise perpendicularly above their bottom.

A meritorious feature of the invention resides in the provision of means for coupling the tool member and the wedge member together for longitudinal, endwise movement but permitting lateral movement relative to one another. In the embodiments of the invention illustrated herein, this provision comprises a plurality of parallel, angularly extending ribs or corrugations formed on the adjoining surfaces of a bladed tool and a wedge. These ribs interfit or mate with one another and extend in a direction angular to that of the direction of movement of the wedge and tool into the recess. As explained previously, the bottom of the main groove for receiving the tool and the auxiliary groove or recess for receiving the wedge are inclined relative to one another. This causes the wedge to travel in a path different from that of the tool. When both are inserted together lengthwise into their respective recesses, the relatively different paths of movement cause them to travel at differing rates. When the wedge abuts the end of its recess it is forced laterally into wedging engagement against the inclined wall of its recess by the passing movement of the ribs on the tool. This engagement locks the tool tightly in position from which it may be removed by lightly tapping on its engaged end. Pressure against the end of the tool in working causes it to hold securely to its seat within the holder as such pressure tends to cause the wedge to lock the tool more strongly in place. Pressure against the opposite end of the tool tends to produce its release.

Various other objects and meritorious features of the invention will be apparent from the following description, wherein:

Figure 1 is a side elevation of a tool assembly, partially broken away to disclose the interior, Fig. 2 is an end view of the tool holder showing implements partially and fully inserted in grooves provided in the holder for that purpose, Fig. 3 is a side view of Fig. 2 taken along lines 3—3 in Fig. 2, Fig. 4 is a cross-sectional view along line 4—4 in Fig. 1, Fig. 5 is a cross-sectional view through the tool and the wedge along lines 5—5 in Fig. 3, Fig. 6 is a side view of a cutting tool, Fig. 7 is an end view of the wedge member, Fig. 8 is a partial side view of a modified tool holder of greater diameter than the previously described holder, Fig. 9 is a side view, partially in cross, partially in elevation of the modification shown in Fig. 8, Fig. 10 is a view of a third modification showing the adoption of the invention to a different type of cutter, Fig. 11 is a side view of the third modification partially cut away to show the locking feature of the holder and the cutter held therein, and Fig. 12 is a cross-sectional view along line 12—12 in Fig. 10.

In the embodiment of the invention illustrated in Figs. 1 to 7 inclusive, the tool holder is indicated at 10 having a bit 12 which is adapted to be rotatively coupled to any power drive in any desirable manner. The holder has a head or enlarged body portion 14 about which are formed a plurality of circumferentially spaced grooves or channels 16. These grooves are shown extending at a slight angle to the axis of the holder but may, if desired, extend parallel thereto as shown in the modification in Figs. 8 and 9. The bottoms 18 of these grooves are inclined downwardly toward the axis of the tool. The inclination of the groove bottoms may be at any angle, the desired angle being determined by the work that has to be accomplished.

Receivable in each of these grooves is a tool 20 which in the present embodiment is illustrated as a cutting implement or reamer. The grooves are each cut away along one wall thereof at 22 to form a recess or ledge for seating a wedge-shaped member 24. The bottom 26 of this recess, or the ledge proper, is inclined relatively to the bottom 18 of the groove as indicated in Figs. 3 and 4. The side wall of the recess is so inclined to slightly overlie the ledge 26 as shown in Fig. 2. The recess, therefore, partakes of the general shape of the wedge member 24. The end wall of the recess against which the wedge member abuts when it is advanced lengthwise into the recess is formed by a pin 28 which is cut away to form the end wall and then driven into the head of the holder. This provides a uniform, well defined wall surface against which the end of the wedge member abuts.

The tool and the wedge are coupled to one another in such a manner that when they are inserted together endwise in their respective grooves, the wedge is caused to be moved into the grooves while at the same time provision is made for lateral self-adjustment of the wedge. This is accomplished by providing a series of spaced parallel ribs or convolutions 30 on the adjacent surfaces of the tool and the wedge. These ribs interfit or mate with one another. As shown in the drawings the ribs slant relatively to the bottom of the grooves, or considering it from the standpoint of the movement of the tool and wedge, the ribs extend at an angle to the direction of this movement. By providing more than one rib in each element, the position of the wedge may be adjusted to several positions on the surface of the tool, and as will appear fully hereinafter, this adjustment will vary the extent to which the tool projects both longitudinally and laterally of the holder.

The angles of the ribs on the tool and the wedge are arranged in a predetermined relationship to the angle between the bottom 18 of the recess upon which the tool seats and the ledge 26 upon which the wedge seats. The extent of these angles may vary but the relationship is constant. For example, if the angle between the bottom 18 of the recess and the ledge 26 is 10°, the angle which the ribs on the tool and wedge bear to the seating edges of their respective elements should differ by 10°. If the ribs on the tool extend at an angle of 25° to the seating edge of the tool, the ribs on the wedge should extend at an angle of 35° to the seating edge of the wedge. This is apparent since the seating edges of both the tool and the wedge must slide upon the bottom 18 and the ledge 26 respectively which, as explained above, differ in the present example by an angle of 10°.

To secure the tools or blades in the grooves or slots of the holder, a wedge member is attached to each of the tools through the medium of their ribbed surfaces. The tool and the wedge are then inserted endwise into a groove, and further movement of the tool will carry the wedge therewith into the groove. The tool will slide along the bottom 18, and the wedge will likewise slide on the bottom or ledge 26. Since the ledge extends angularly to the bottom of the groove, it is apparent that the wedge will be caused to move laterally or transversely to the tool at the same time both advance longitudinally into the groove. Its lateral movement will be confined to the direction of the ribs 30. Furthermore, the wedge will advance at a slightly slower rate than the tool since it is traversing a lateral as well as a longitudinal path. When the front end of the wedge abuts the end wall of the recess 22, further advance of the wedge is prohibited. However, the shank of the blade may advance further, and upon continued advances, the slanting ribs on the shank force the wedge to rise in its recess until it is tightly wedged between the tool and the overhanging inclined wall of the recess. The tool or blade will then be tightly wedged in the groove. The reverse action occurs when the tools or cutters are withdrawn from the grooves. In removing the tools, a slight tapping on the inserted ends of their shanks will suffice to break the wedging action and the tools will be free to be removed.

The cooperating ribs 30 on the wedge and blades are so formed that the blade is advanced or withdrawn as the case may be but when seated the flat bottom faces 31 of the channel portions between the angular side walls receive the thrust and there is a slight clearance between the opposed angular faces.

Figs. 2 and 3 will show the positions assumed by the tool and the wedge during their advance into the grooves. When the tool and wedge are approximately halfway inserted they assume the position shown in the upper part of Fig. 2 and as projected in Fig. 3. The distance A represents the distance the tool is required to move before being fully inserted. The distance A' represents the radial contraction by the end of the tool as it advances to fully inserted position. This last action is the result of the inclination of the groove to the axis of rotation of the holder 19. The left portions of Fig. 2 show two tools fully advanced into their respective grooves or channels. This is likewise shown in Fig. 1. The raised or spaced condition of the tightly engaged wedges above their respective ledges are shown in Figs. 1 and 2. As explained previously, the wedges are raised into tight fitting engagement by the action of their ribs as they ride or slide up the slanting ribs on the blades when the latter continue to advance after the wedges are stopped. Contrarily, the act of raising the wedge into tight wedging position causes the cutting blade to be driven downward into tight fitting engagement with the seat of the recess. It is therefore seen the wedge and blade mutually cause or tend to cause lateral movement of each other as they advance lengthwise into their respective seats.

By inclining the bottom of the grooves 16, the tools or blades are flared outwardly beyond the end of the tool holder. The widest diameter of the assembly is therefore provided at the cutting end. The bottom can be inclined at various angles depending upon the character of the work desired.

In the embodiment of the invention illustrated in Figs. 8 and 9 a milling cutter is shown. Each of the teeth or blades 40 are disposed in grooves or slots positioned circumferentially around the outer periphery of the rotary support or holder 42. Each of these blades are held tightly in position by the wedge assembly previously described in Figs. 1 to 8. The recesses in which the wedges 44 are received are so arranged that alternate blades and associated wedges are inserted in same directions. This is clearly shown in Fig. 9 where the wedge receiving recess opens first on one side of the body of the cutter and then on the other side. Instead of having the cutting edges of the blades extending in the same direction parallel with the axis of the holder, they may all extend at the same angle thereto or at angles reversely to one another.

In the embodiment of the invention illustrated in Figs. 10, 11, and 12, there is shown a cutting blade assembly seated within a groove formed in the surface of a solid cylindrical body 50. The groove 52 may extend at an angle to the axis of the body as shown in Fig. 10. The bottom of the groove is inclined downwardly into the body 50 for the major portion of its length, and then curved sharply upward for the remaining portion. This last portion provides clearance into which a tool may be inserted for driving the cutting blade 54 out of the groove.

The recess 56 for receiving the wedge 58 is similar in formation to the wedge receiving recesses described in previous embodiments. The wedge is provided with an inclined overhanging wall against which the wedge is driven when the wedge and the blade are advanced together into their respective recesses. The recess differs from the previous described recesses in that it is closed at both ends. But the recess is of a length to allow the wedge endwise movement with the blade until the latter is advanced sufficiently in groove 52. To assemble the blade upon body 50, the wedge is first deposited in recess 56. The blade is then slid edgewise at an oblique angle into groove 52 with the ribs on the blade and the wedge mutually interfitting with one another. It is obvious in this modification that more than one blade assembly can be provided on the tubular body 50.

The cutting edge of the blade is indicated at 60 and it is apparent that the pressure of the cutting action will urge or tend to urge the blade further into the groove and strengthen the wedging action. An important advantage of the inclined overhanging wall in the wedge recess in this as well as the other embodiments of the invention is the fact that the pressure of the cutting operation cannot loosen the blade within the groove. The overhanging character of the wall prevents the wedge from shifting or falling out of the body during the cutting operation. Instead the greater the pressure exerted on the cutting edge of the blade, the greater the wedging action becomes. Furthermore, the wedge in this as well as the other modifications described herein takes all the end thrust or pressure during the cutting operation. No provision is therefore necessary on the tool holding body for taking the end thrust.

A slight clearance may be provided between the interfitting ribs on the cutter and the wedge. This clearance is illustrated in Fig. 5. The clearance may be formed by making the ribs on either the blade or the wedge a little narrower than the corresponding grooves in the other member. In Fig. 5, the blade 20 is in the art of advancing into its recess on the body 10 and is carrying the wedge 24 therewith. As a result the clearance between the ribs appears on the underside of the ribs on the blade.

What I claim is:

1. A tool holding device comprising, in combination, a tool holder having a channel, a tool adapted to be slidably received in said channel, a wedge shaped member likewise adapted to be slidably received in said channel together with said tool, means coupling said tool and said wedge-shaped member together for slidable lengthwise movement through said channel, but permitting lateral movement of the wedge member relative to the tool, said channel provided with separate bottom portions inclined longitudinally to one another and upon one of which the tool is adapted to slide and upon the other of which the wedge member is adapted to slide, said relative difference in inclination of said bottom portion causing said wedge member to move laterally of the tool as the two are slidably directed lengthwise into the channel, and means for limiting endwise movement of said wedge member so as to cause the same to shift laterally relative to the tool as the latter continues to advance in the channel whereby the wedge member is forced into tight fitting engagement with the tool.

2. A device of the class described, comprising: a holder having a slot formed therein adapted for the reception of a tool; a tool; a lock member, said tool and said lock member, upon being positioned in side by side relation with opposed faces in engagement, being slidably insertible into said slot; means projecting into said slot intermediate its ends for engaging said lock member and limiting slidable movement of the same longitudinally of said slot beyond a predetermined distance; and means cooperating with said tool and said lock member for effecting transverse relative movement of said tool and said lock member upon slideable longitudinal movement of said tool subsequently to the movement of said lock member said predetermined distance.

CLAUDE A. WEST.